Figure 1:
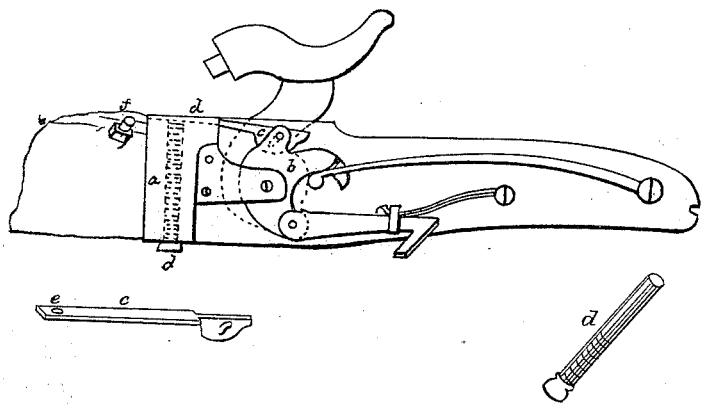
Figure 2:
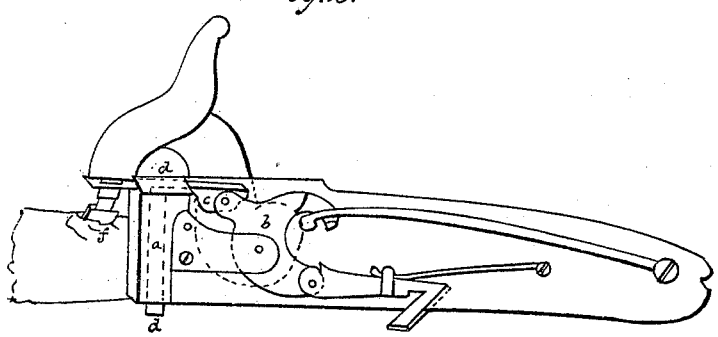

A6725 OR AI 129

J. S. BUTTERFIELD.
Gun Lock.

No. 129. A. I. Patented Dec. 11, 1855.

*Witnesses.*
Wm. Thornley
Amos Sigler

*Inventor.*
J. S. Butterfield

N. PETERS, PHOTO-LITHOGRAPHER, WASHINGTON, D. C.